United States Patent [19]

Curry et al.

[11] Patent Number: 5,151,288

[45] Date of Patent: * Sep. 29, 1992

[54] FOOD PROCESSING APPARATUS AND METHOD

[75] Inventors: Ernest W. Curry, Wyckoff, N.J.; Marvin F. Beach, Louisville, Ky.

[73] Assignee: Besst Frozen Products, Inc., Hackensack, N.J.

[*] Notice: The portion of the term of this patent subsequent to Jul. 9, 2008 has been disclaimed.

[21] Appl. No.: 671,026

[22] Filed: Mar. 18, 1991

Related U.S. Application Data

[63] Continuation of Ser. No. 598,431, Oct. 16, 1990, Pat. No. 5,030,465.

[51] Int. Cl.$^5$ .......................... A23L 1/00; A23G 9/00
[52] U.S. Cl. ........................... 426/474; 165/156; 366/328; 366/330; 426/519; 426/524
[58] Field of Search ............... 366/328, 330, 327, 90, 366/149; 261/86; 426/474, 519, 524; 62/62, 63, 342, 343, 344; 99/455; 162/6; 165/156

[56] References Cited

U.S. PATENT DOCUMENTS

| | | | |
|---|---|---|---|
| 130,473 | 8/1872 | Broughton | 366/328 |
| 2,914,385 | 11/1959 | Massey et al. | 366/328 |
| 3,296,817 | 1/1967 | Stoelting | 165/156 |
| 3,446,032 | 5/1969 | Bottum | 165/156 |
| 3,545,063 | 12/1970 | Mitchell | 165/156 |
| 4,201,558 | 5/1980 | Schwitters et al. | 62/342 |
| 4,650,343 | 3/1987 | Doom et al. | 366/330 |
| 4,887,911 | 12/1989 | Miyaji | 366/328 |
| 5,046,548 | 9/1991 | Tilly | 165/156 |

FOREIGN PATENT DOCUMENTS

1082576 6/1960 Fed. Rep. of Germany ...... 366/327
WO88/05095 7/1988 World Int. Prop. O. ............. 162/6

Primary Examiner—George Yeung
Attorney, Agent, or Firm—Finnegan, Henderson, Farabow, Garrett & Dunner

[57] ABSTRACT

An apparatus for making a frozen confection product from a liquid food substance comprises a gas port for selectively injecting gas from a pressurized source into the liquid food substance at an injection point to form a mixture, a freeze tube having an inlet end and an outlet end and having a substantially cylindrical wall for containing the mixture therein, a cooling circuit for cooling an external surface of the cylindrical wall, and a whipping auger disposed within the freeze tube for emulsifying the liquid food substance portion of the mixture with the gas portion thereof, the whipping auger propelling a first portion of the mixture in a helical pattern from the inlet end of the freeze tube toward the outlet end and for simultaneously propelling a second portion of the mixture in a direction from the outlet end toward the inlet end of the freeze tube. A method for making a frozen confection from a liquid food substance comprises the steps of mixing a gas with the liquid food substance, introducing the mixture into a freeze tube having an inlet end and an outlet end, propelling a first portion of the mixture from the inlet end of the freeze tube toward the outlet end thereof and simultaneously propelling a second portion of the liquid from the outlet end of the freeze tube toward the inlet end thereof to emulsify the gas with the liquid food substance, and cooling the mixture.

18 Claims, 6 Drawing Sheets

FIG. 2a

FOOD PROCESSING APPARATUS AND METHOD

This is a continuation of application Ser. No. 07/598,431, filed Oct. 16, 1990, now U.S. Pat. No. 5,030,465.

BACKGROUND OF THE INVENTION

1. Field of the Invention

The present invention relates to an apparatus and method for making frozen confections. Although suitable for all types of frozen confections, the apparatus is described in connection with soft-serve sorbets and yogurts, for which it has particular advantages.

2. Description of the Related Art

Typical related art commercial frozen confection machines contain four integrated systems; an insulated compartment for storing liquid food substances; a gas circuit for providing an edible gas for mixture with the liquid food substances; a production unit for making a frozen confection from the mixture of liquid and gas; and a refrigeration circuit for cooling both the insulated compartment and the production unit.

The storage compartment is typically connected to the production unit by a tube which defines a food path. In order to minimize bacterial contamination within the system, it is desirable to minimize the length of the food path and the number of components through which the liquid food substance must pass before it is frozen in the production unit.

The gas circuit is provided to mix gas with the liquid food substance which typically serves two functions. First, it inflates the liquid food substance to increase the volume of frozen end product that can be produced from a given volume of liquid food substance. Second, it decreases the density of the frozen end product which leads to a smoother texture in the frozen end product.

The production unit, which may be cooled by freon circulated by the refrigeration circuit, typically contains a cylindrical tube for receiving liquid food substance therein. Augers disposed within the tube churn the liquid food substance to mix it with the gas and to expose the mixture to the cooled walls of the cylinder, thereby freezing the mixture.

As the liquid food substance cools in the production unit, its ability to absorb and be become emulsified with the gas decreases. Thus, if a critical temperature is reached before the gas and liquid are fully emulsified, pockets of gas will form within the cylinder. When a dispensing valve on the cylinder is opened, these pockets of gas may "blow-out", spewing food product through the valve. In addition, product quality may be poor if full emulsification has not occurred.

In order to prevent blow-outs and to provide a fully emulsified product, the cooling rate may be decreased. However, the slower the mixture cools, the larger the crystal size in the end product. Since smaller crystal size results in a smoother textured end product, a fast cooling rate is desirable.

Some related art devices separately inject the liquid and gas into the production unit, and some include premixing units or saturators in the food path for mixing the liquid and gas before it enters the cooled environment of the production unit. A drawback of premixing units is that they provide additional nooks and crannies within the food path that may trap food particles and thereby lead to bacterial growth.

Thus, a major drawback of related art devices is their inability to rapidly cool a liquid and gas mixture to achieve small crystal structure, while at the same time ensuring that the gas and liquid become fully emulsified.

While related art devices may use pumps to convey liquid food substance into a production unit, they may not be designed to always maintain a positive pressure in the system during use. Rather, they may fluctuate between positive pressure and atmospheric pressure, or may substantially operate at atmospheric pressure. If the pressure in the system falls to atmospheric pressure, contaminants may enter the system leading to bacterial growth. Thus, more frequent cleaning may be necessary to maintain a bacteria free environment.

Further, many related art devices are open system devices wherein liquid food product is poured into an opened holding reservoir or is otherwise exposed to air from the surrounding atmosphere. Such structure not only increases the possibility that bacteria and foreign particles will contaminate the food product, but also allows odors in the surrounding atmosphere to be absorbed into the food product, degrading the taste of the end product. Hospitals and other institutions that use odorous sanitizing chemicals avoid frozen confection machines in their cafeterias for this very reason.

An object of the present invention is to provide a frozen confection apparatus and method that rapidly cools a liquid and gas mixture to ensure small crystal size.

Another object of the present invention is to provide an apparatus and method that ensures full emulsification of the liquid food substance and the gas even when rapid cooling occurs in the production unit.

A further object of the present invention is to provide an apparatus and method for premixing the liquid and the gas while at the same time minimizing locations within the food path where food particles may become lodged.

An additional object of the present invention is to provide an apparatus and method that ensures homogeneous mixing of liquid food substance and gas and prevents the occurrence of blow-outs.

In addition, it is an object of the present invention to provide a frozen confection apparatus and method that maintains a positive pressure within its food path to discourage the entry of contaminants.

An even further object of the present invention is to provide a frozen confection apparatus and method that is an hermetically sealed closed system in order to prevent either contaminants to enter the system or odors from the surrounding atmosphere to be absorbed into the food product.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

SUMMARY OF THE INVENTION

To achieve the objects and in accordance with the purposes of the invention, as embodied and broadly described herein, the apparatus for making a frozen confection product from a liquid food substance, comprises means for selectively injecting gas from a pressurized source into the liquid food substance to form a mixture, tube means having an inlet end and an outlet end and having a substantially cylindrical wall for containing the mixture therein, means for cooling an external surface of the cylindrical wall, and whipping means disposed within the tube means for emulsifying the liquid food substance portion thereof with the gas portion thereof, the whipping means for propelling a first portion of the mixture from said inlet end of said tube means toward said outlet end in a helical pattern, and for propelling a second portion of the mixture in a direction from said outlet end toward said inlet end.

The method of the present invention for making a frozen confection from a liquid food substance, comprises the steps of mixing a gas with the liquid food substance, introducing a mixture of the gas and the liquid food product into a freeze tube, propelling a first portion of the mixture from the inlet end of the freeze tube toward the outlet end thereof and simultaneously propelling a second portion of the liquid in a direction from the outlet end of the freeze tube toward the inlet end thereof to emulsify the gas with the liquid food substance, and cooling the mixture.

It is to be understood that both the foregoing general description and the following detailed description are exemplary only and are not restrictive of the invention, as claimed.

The accompanying drawings which are incorporated in and constitute a part of this specification illustrate one embodiment of the invention and together with the description serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
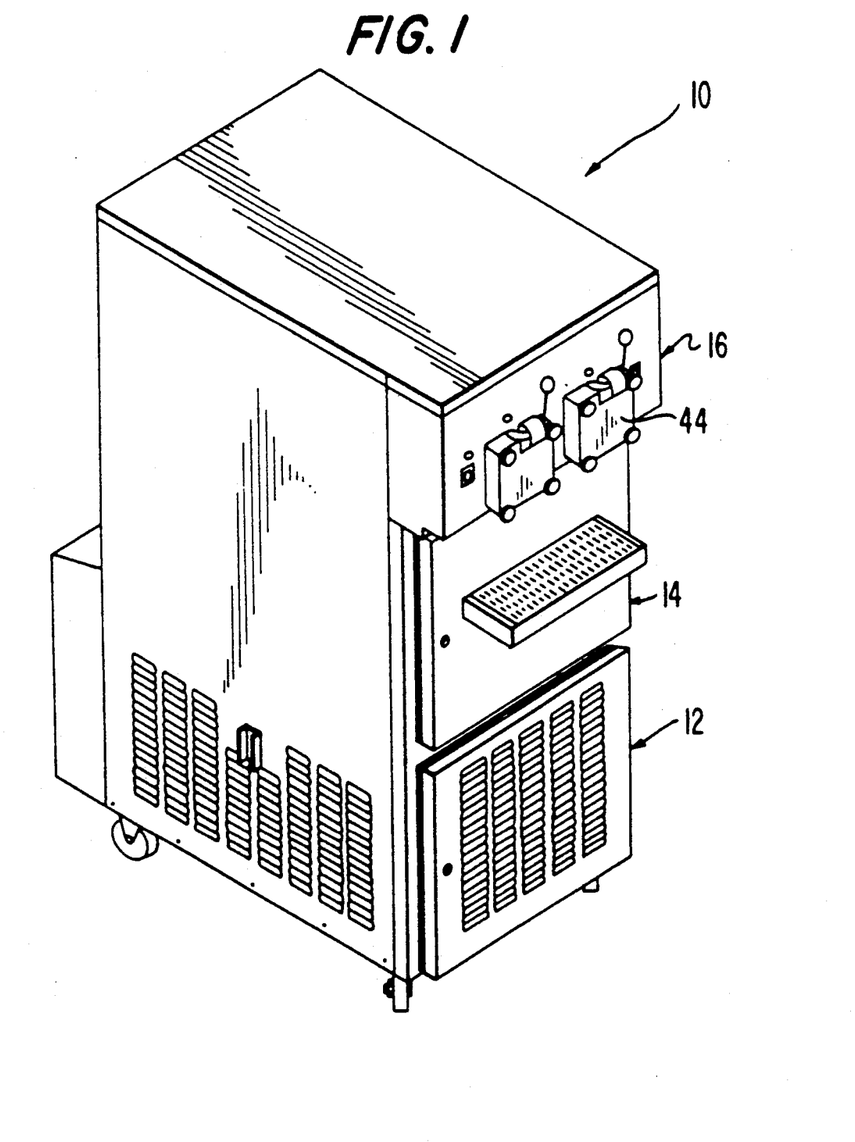
FIG. 1 is a view in perspective of a frozen confection machine incorporating the present invention.

As depicted in FIG. 1, frozen confection machine 10 includes refrigeration/gas storage unit 12, insulated food compartment 14, and production unit 16.

Figure 2:
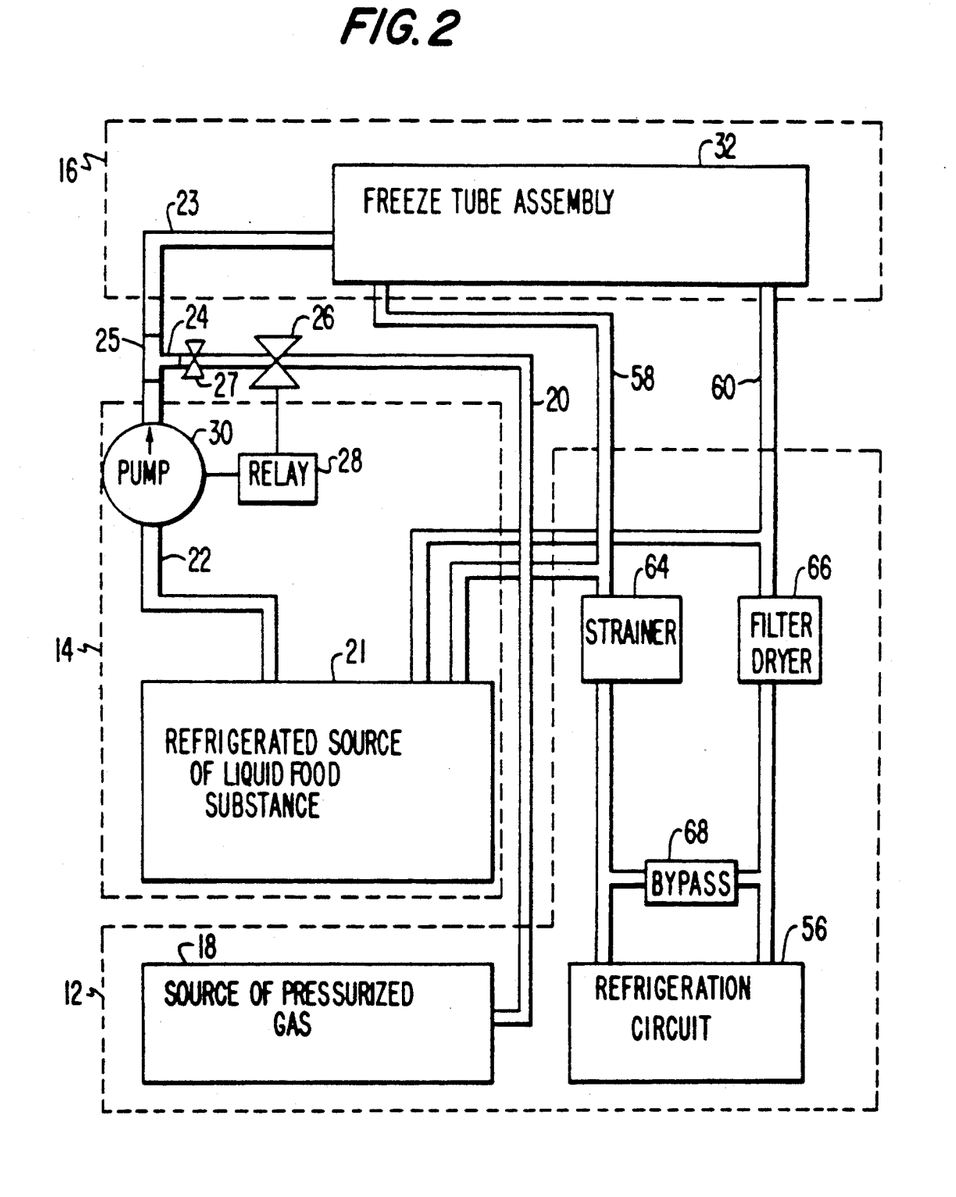
FIG. 2 is a block diagram depicting the interconnection of key components of the frozen confection machine in accordance with the present invention and as shown in FIG. 1.

As depicted in FIG. 2, freeze tube assembly 32 of production unit 16 is connected via food line 22 to source of liquid food substance 21 stored in insulated food compartment 14. Preferably, refrigerated food source 21 includes a 2 ½ gallon bag of liquid food substance connected to food line 22 with a connector that forms an air-tight seal. Preferably, the liquid food substances contains edible stabilizers that lower the freezing point of the liquid to below 10° F. Numerous commercial grade stabilizers are available that reduce the freezing point of food products to below 10° F.

A pressurized source of gas 18 (preferably nitrous oxide) is stored in unit 12 and is connected via gas line 20 to food line 22. Refrigeration circuit 56 is also disposed in unit 12 and is connected via refrigeration lines 58 and 60 to freeze tube assembly 32 and insulated compartment 14.

In accordance with the invention, there is provided an apparatus for making a frozen confection product from a liquid food substance comprising means for selectively injecting a gas from a pressurized source into the liquid food substance to form a mixture.

As embodied herein, means for selectively injecting gas from a pressurized source into the liquid food substance includes gas line 20 connected to food line 22 at injection point 24. Injection point 24 may include T-connector 25 disposed in food line 22 for connecting gas line 20 to food line 22 at substantially a 90° angle. The 90° injection of gas produces turbulence in food line 22 which aids in mixing the liquid and gas.

Figure 2A:
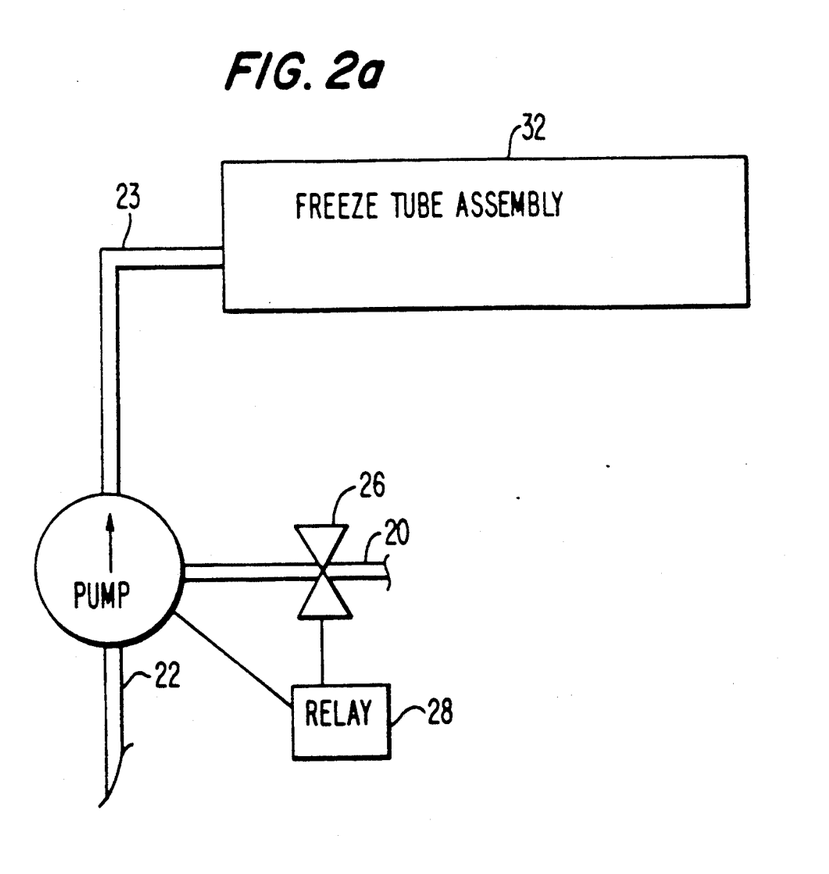
FIG. 2a is a block diagram depicting an alternative embodiment of the interconnection of a portion of the components depicted in FIG: 2.

According to an alternative embodiment of the present invention and as depicted in FIG. 2a, gas line 20 may be connected directly into a port in pump 30. In this manner, the pumping turbulence caused by pump 30 aids in premixing the liquid and gas.

Mixing portion 23 of food line 22 connects T-connector 25 to freeze tube assembly 32. As liquid and gas travel together through mixing portion 23 of food line 22, premixing occurs. Preferably, the length of mixing portion 23 should be sufficient to allow at least 25–30% of the injected gas to be absorbed into the liquid food substance before the mixture enters freeze tube assembly 32. In order to achieve 25–30% premixing the mixing portion 23 should be at least about 5 or 6 inches in length. Obviously, this minimum length may vary depending upon the ingredients of the food substance, the gas used, and whether the gas is injected through pump 30 as shown in FIG. 2a.

Preferably, injection point 24 is spaced a predetermined distance from freeze tube assembly 32 to allow mixing of liquid food substance and gas to occur before the mixture enters freeze tube assembly 32.

Injection means may also include solenoid valve 26 disposed in gas line 20 upstream of T-connector 25 and alligator valve 27 disposed in gas line 20 proximate T-connector 25. Current sensing relay circuit 28 electrically connects valve 26 to pump 30 disposed in food line 22 downstream of injection point 24. When pump 30 draws a preselected current such as 3 amps, for example, relay circuit 28 opens valve 26 to inject gas from pressurized gas source 18 into food line 22 at injection point 24. This arrangement prevents freeze tube "blow out" by insuring that an amount of liquid food substance sufficient to absorb a portion of the injected gas is present at injection point 24 when gas first enters food line 22. Alligator valve 27 may be provided as a check valve to insure that food substance does not back into gas line 20.

Figure 3:
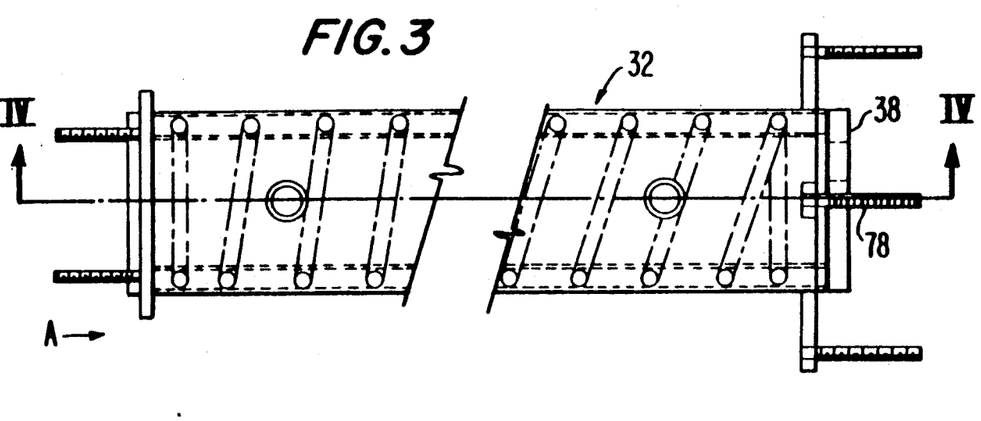
FIG. 3 is a longitudinal view of the freeze tube assembly depicted in FIG. 2.
Figure 4:
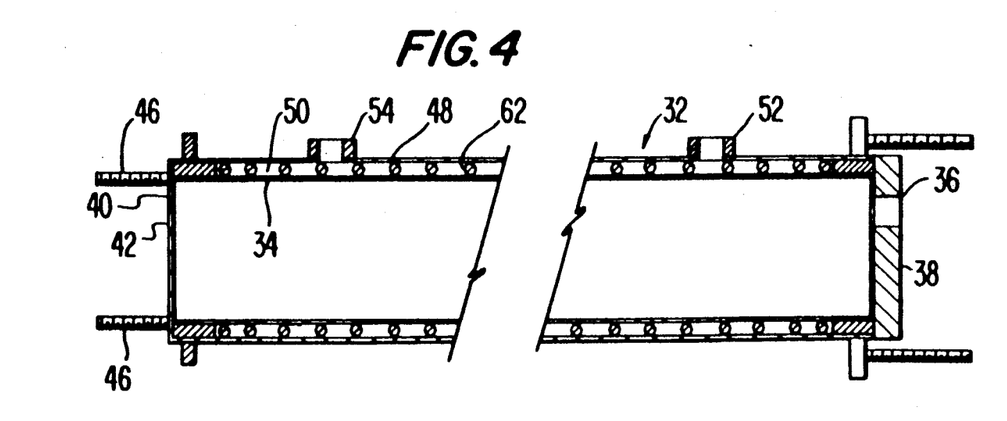
FIG. 4 is a cross-sectional view taken along line IV—IV in FIG. 3.
Figure 5:
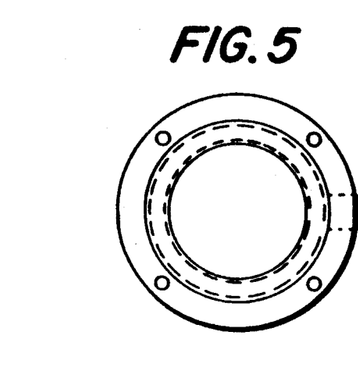
FIG. 5 is an end view of the freeze tube assembly as seen from the A direction in FIG. 3.

In accordance with the invention, there is also provide tube means having an inlet end and an outlet end and having a substantially cylindrical wall for containing the mixture therein. As embodied herein and as depicted in FIGS. 3-5, tube means includes stainless steel freeze tube 34, a component of freeze tube assembly 32. Stainless steel freeze tube 34 has a delron block 38 affixed at the inlet end thereof. Port 36 is disposed in delron block 38 for connection to food line 22. Thus, when pump 30 is activated and valve 26 is opened by relay circuit 28, a mixture of gas and liquid food substance is conveyed into freeze tube 34 through port 36.

Plate 40 is disposed on the outlet end opening of freeze tube 34 opposite delron block 38. Dispensing port 42 is disposed in plate 40 for permitting frozen end product to exit freeze tube 34. Elongated bolts 46 extend from plate 40 for securing dispensing valve assembly 44 (shown in FIG. 1) thereto. Dispensing valve assembly 44 allows frozen end product to be selectively dispensed from cylindrical tube 34.

In accordance with the invention, there is provided means for cooling an external surface of the cylindrical wall. As embodied herein and as depicted in FIG. 4, cooling means includes cooling wall 48 disposed about freeze tube 34 and spaced a predetermined distance therefrom to define space 50 therebetween. Inlet port 52 and outlet port 54 are disposed in cooling wall 48 and are connected to refrigeration circuit 56 via lines 58 and 60 respectively.

Refrigeration circuit 56 may include a standard refrigeration circuit 56 including a compressor. An air cooled condensing section having a 1.5 hp motor and rated at 7800 btu's has proven to be effective. The desired level of cooling depends upon the ingredients of the liquid food substance. However, with most frozen sorbets and yogurts, it is desirable to cool the mixture to between 10° F. and 0° F., preferably about 9° F.

It is also desirable to provide in-line devices to protect refrigeration circuit 56 from damage. A standard strainer 64 is provided in line 58, and a standard filter dryer 64 is provided in line 60 to prevent moisture and foreign particles from damaging the compressor of refrigeration circuit 56.

Refrigeration circuit 56 circulates a liquid coolant such as freon through space 50 between cylindrical tube 34 and cooling wall 48. Preferably directing means are disposed in space 50 to evenly expose the exterior wall of cylindrical tube 34 to refrigerant. In a preferred embodiment, directing means includes metal rod 62 coiled about tube 34. It is preferable for metal rod 62 to have a diameter substantially equal to the distance between the freeze tube 34 and cooling wall 48. Thus, refrigerant entering inlet port 52 is directed in a spiral pattern about the exterior of cylindrical tube 34, evenly exposing the entire surface of freeze tube 34 to refrigerant. In order to further increase cooling efficiency, a well known insulation such as Armaflex TM is wrapped around cooling wall 48.

The above described arrangement allows freeze tube assembly 32 to cool mixtures at an accelerated rate thereby inhibiting crystal growth and providing an end product with a smooth texture. Cooling rates are selectively variable depending upon the product being produced. In order to selectively vary the cooling rate of freeze tube assembly 32, expansion valves (not shown) may be provided on lines 58 and 60 proximate inlet port 52 and outlet port 54, respectively. The expansion valves include sensors for constantly metering the line temperatures and pressures to open and close the valves when preselected set points are reached. In this manner, the temperature within freeze tube assembly 32 may be precisely controlled. When the mixture enters freeze tube assembly 32 it is at a temperature of approximately 35-42° F. Freeze tube assembly 32 cooperates with refrigeration circuit 56 to cool the mixture to about 9° F. in 7-8 minutes or less.

Refrigeration circuit 56 also cools insulated food compartment 14. Refrigerating the liquid food substance serves two important purposes. First, refrigerating the food substance retards spoilage. Second, since the liquid food substance entering freeze tube assembly 32 is already precooled in insulate food compartment 14, the desired high speed freezing within freeze tube assembly 32 occurs more rapidly.

Bypass valve 68 is provided between lines 58 and 60 for allowing the compressor of refrigeration circuit 56 to circulate refrigerant when expansion valves (not shown) at the freeze tube and insulated food compartment 14 are closed. Bypass 68 thereby prevents burn out of the compressor.

In accordance with the invention, there is provided whipping means disposed within the tube means for emulsifying the liquid food substance portion of the mixture with the gas portion thereof, the whipping means propelling a first portion of the mixture in a first direction from the inlet end of the tube means toward the outlet end and for simultaneously propelling a second portion of the mixture in a direction from the outlet end toward the inlet end of said tube means. As embodied herein and as depicted in FIGS. 6-9, whipping means includes auger 70 having shaft 72 with a plurality of fins 74 extending therefrom. Auger 70 is rotatably disposed in freeze tube 34 to emulsify the gas and the liquid food substance and to convey the mixture from inlet end 104 to outlet end 106 of freeze tube assembly 34 through rotation of shaft 72. Simultaneously, a pressure differential across each fin 74 causes a second portion of the liquid to be drawn through openings 76 in fins 74 in a direction from outlet end 106 towards inlet end 104 of cylindrical tube 34.

Figure 6:
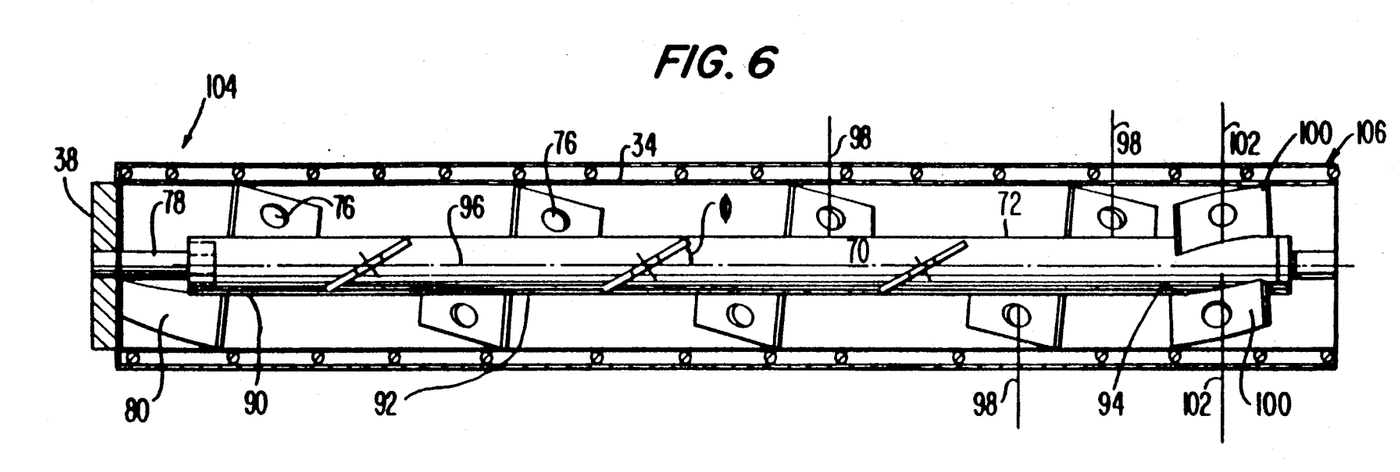
FIG. 6 is a longitudinal perspective view of an auger in accordance with the present invention.
Figure 7:
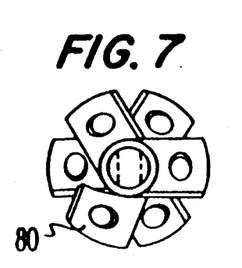
FIG. 7 is an inlet end view of the auger as shown in FIG. 6.
Figure 9:
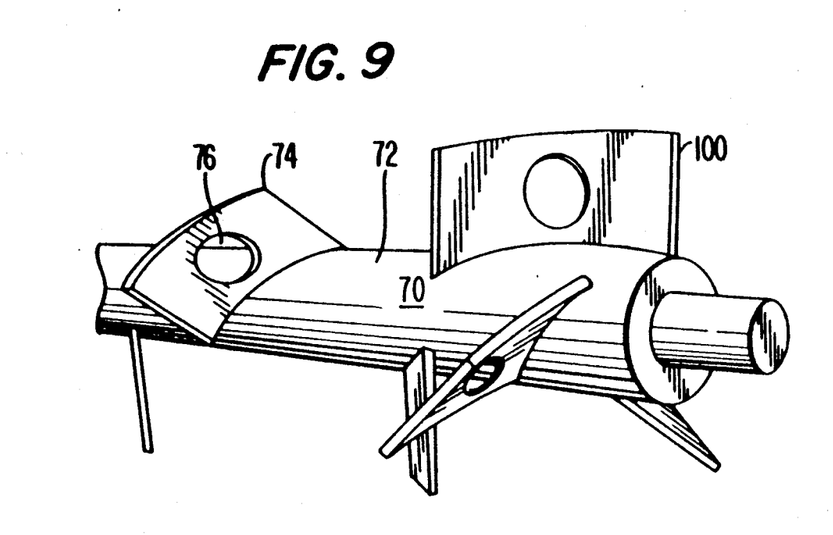
FIG. 9 is an oblique view of a portion of the auger shown in FIG. 6.

Auger 70 includes whipping fin portion 92 disposed between scooper fin portion 90 and dispensing fin portion 94. Whipping fin portion 92 includes ten whipping fins 74 uniformly spaced axially along shaft 72. Whipping fins 74 are positioned such that the axial location of the leading edge of each fin 74 corresponds to the axial location of a trailing edge of an adjacent fin 74. Each of fins 74 are welded to shaft 72 at an angle $\phi$ of 30° relative to central axis 96 of shaft 72. In addition, the center line 98 of each of fins 74 is radially spaced from each of the other whipping fins 74 by an angle $\theta$ of 120°.

Elongated scooper fin 80 is disposed at scooper fin portion 90 of shaft 72 and extends toward delron block 38. The center line of scooper fin 80 is radially offset from the center line of an adjacent whipping fin 74 by 120°. During rotation of shaft 72, scooper fin 80 draws stagnating mixture away from delron block 38 and insures that gas pockets do not form toward the inlet end 104 of freeze tube 34.

Figure 8:
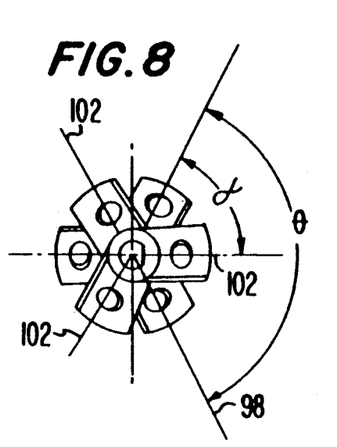
FIG. 8 is an outlet end view of the auger as shown in FIG. 6.

Three dispensing fins 100 are disposed on the dispensing fin portion 94 of auger 70. Similar to fins 74, dispensing fins 100 are radially spaced from each other by angles of 120°. However, unlike fins 74, the center lines 102 of dispensing fins 100, lie in the same plane perpendicular to central axis 96 of shaft 72. The radial position of center lines 102 of dispensing fins 100 are offset from center lines 98 of fins 74 by an angle $\alpha$ of 60°.

Each of fins 74 and 100 are perforated with circular openings 76 disposed at central portions thereof. The surface area of each opening 76 is roughly equal to one quarter of the surface area of each fin 74. As shaft 72 rotates, the rotation in combination with the shape and angling of fins 74 causes low pressure to occur on the forward sides of fins 74, and high pressure to occur on the rear sides. Thus, as a first portion of the mixture is propelled forward in a helical pattern towards outlet end 106 by the rotation of fins 74, the pressure differential across the fins causes a second portion of the mixture proximate each of fin 74 to be drawn rearward toward inlet end 104 through openings 76. The pressure differential also cause a turbulent vortex effect to occur on the rear sides of fins 74 which rapidly emulsifies the liquid and gas portions of the mixture.

Shaft 72 is connected to a motor (not shown) through drive shaft 78 that extends through a lip seal (not shown) in delron block 38. The lip seal includes a sleeve that engages drive shaft 78, permitting rotation without allowing mixture to escape from freeze tube 34 through the shaft opening. The Varilip TM seal manufactured by American Varaseal TM provides an effective lip seal for drive shaft 78.

The invention may also include pressure means for maintaining a positive pressure on said mixture within said tube means. As embodied herein, pressure means includes pump 30 disposed in food line 22. Preferably, pump 30 is sized to maintain a system pressure of at least 30 psi, preferably 35 psi. It is also preferable for pump 30 to be controlled to exert less force at injection point 24 then the force exerted by pressurized gas source 18. Should the pressure in food line 22 exceed the pressure in gas line 20, liquid food product may become deposited in gas line 20 leading to bacterial growth. As described earlier, a check valve such as alligator valve 27 may be disposed in gas line 20 adjacent injection point 24 to prevent contamination of gas line 20.

Maintaining a positive pressure in the system serves three important functions. First, the outward force exerted by pump 30 discourages entry of contaminants into the system. This feature in combination with other features of the invention allow the frozen confection machine to be used for extended periods of time between cleanings without the threat of bacterial contamination.

Second, the pressure environment aids in the homogenous mixing of gas and liquid food substance which is critical to the quality of the end product.

Finally, since substances tend to cool faster at elevated pressures, pressure in freeze tube 34 causes the mixture to cool more quickly then it would otherwise cool at atmospheric pressure. The faster cooling process retards crystal growth in the frozen end product leading to a smoother texture.

The present invention has been designed as a hermetically sealed closed system. Food line 22 is directly connected to a 2 ½ gallon bag of liquid food substance using a connector that forms an air-tight seal. The entire food path upstream of pump 30 is maintained at a positive pressure to insure that contaminants from the outside atmosphere cannot enter the system. It is also preferable to locate pump 30 either adjacent to or within refrigeration unit 14 so that the portion of food line 22 connecting the source of liquid food substance 21 and pump 30 is refrigerated to inhibit bacterial growth.

In addition, the invention may be constructed to meet clean-in-place (CIP) standards. In order to meet CIP standards, the food path is constructed so that there are no "hard 90°" turns wherein particles of food may become lodged. As described earlier, the pressure in food line 22 is controlled to be maintained below the pressure in gas line 20 so that food substance will not back-up into gas line 20. In addition, the use of the lip seal for drive shaft 78 provides a rotational connection free of nooks and crannies that might otherwise trap food particles.

The invention is operable in a cleaning mode wherein a solution source is substituted for the bag of liquid food substance. During cleaning, a catch basin is positioned beneath dispensing valve assembly 44 to collect spent cleaning solution.

In accordance with the present invention, there is provided a method for making a frozen confection from liquid food substance comprising the step of mixing a gas with the liquid food substance. As described earlier, a gas such as nitrous oxide is injected at a 90° angle into food line 22. The gas and liquid then travel together into cylindrical tube 34 through mixing portion 23 of food line 22. The turbulence caused by the 90° injection in combination with the travel through mixing portion 23 serves to premix the liquid and gas. In addition, the temperature in premixing portion 23 is higher than in tube 34. Since gas is absorbed by the liquid more rapidly at higher temperatures, the premixing line is advantageous for this additional reason. During premixing, approximately 25%–30% of the injected gas is absorbed by the liquid food substance in premixing portion 23 of food line 22.

Valve 26 may be adjusted so that a desired volumetric ratio of gas to liquid food substance may be achieved. It is preferable to adjust valve 26 so that the ratio of gas to liquid food substance is at least about 1:1. Successful tests have also been achieved at levels as high as about 1.4:1.

A high gas inflation ratio serves two important purposes. First, it greatly increases the amount of end product that can be produced from a given volume of liquid food substance. Second, it lowers the density of the end product to provide a smoother texture.

Also, in accordance with the invention, the method comprises the step of introducing the mixture of the gas and the liquid food substance into a freeze tube assembly. As described earlier, mixing portion 23 of food line 22 conducts the mixture into freeze tube assembly 32 through port 36. Freeze tube assembly 32 serves as an evaporator to rapidly cool the mixture of liquid food substance and gas.

The method of the present invention also includes propelling a first portion of the mixture from the inlet end of the freeze tube toward the outlet end thereof and simultaneously propelling a second portion of the liquid in a direction from the outlet end of the freeze tube toward the inlet end thereof to emulsify the gas with the liquid food substance. As embodied herein, and as described earlier, whipping is achieved through the rotation of auger 70. Whipping should occur vigorously enough so that molecules of gas surround each liquid molecule.

Preferably, in order to achieve the necessary whipping, the motor that rotates auger 70 through drive shaft 78 should be capable of maintaining over about 45 rpms. At this rate, auger 70 simultaneously propels the mixture in opposite directions within freeze tube 34. As auger 70 rotates a majority of the mixture is propelled towards outlet end 106 in a helical pattern. However, a second portion of the mixture is drawn towards inlet end 104 through openings 76 in fins 74. A turbulent vortex occurs on the inlet end side of each fin 74 which aids in whipping the mixture. Of course, the necessary revolutions per minute will vary depending upon the ingredients of the food substance, the type of gas used, and the design of the auger.

The inventors have found that many different liquid food substances mixed with nitrous oxide require that full emulsification occur before the mixture reaches about 12° F.–15° F. Below 15° F., many food substances loose their ability to absorb nitrous oxide. With the auger described above, a rotational speed of 45 rpms is usually sufficient to achieve full emulsification before the critical temperature of 12° F.–15° F. is reached.

The method of the present invention also comprises the step of cooling the mixture. As discussed earlier, the mixture is cooled in freeze tube assembly 32. The desired rapid rate of cooling is achieved by exposing substantially the entire external surface of freeze tube 34 to refrigerant and pressurizing freeze tube 34 with pump 30.

Other embodiments of the present invention will be apparent to those skilled in the art from consideration of the specification and practice of the invention disclosed herein. It is intended that the specification and examples be considered as exemplary only with a true scope and spirit of the invention being indicated by the following claims.

What is claimed is:

1. A food processing apparatus, comprising:
   tube means having an inlet end and an outlet end and having a substantially cylindrical wall for containing a food substance therein, said tube means including a double walled cylindrical tube having a space disposed between the walls thereof;
   means disposed within said tube means for whipping the food substance, said whipping means propelling a first portion of the food substance in a helical pattern from said inlet end of said tube means toward said outlet end and having a plurality of portions spaced from one another within said tube means for simultaneously propelling a second portion of the food substance in a direction from said outlet end toward said inlet end of said tube means; and
   means for directing a fluid in said space between the walls of the double walled tube, said directing means including a metal rod coiled about said cylindrical wall for directing fluid about said cylindrical wall between the inlet and outlet ends of the tube means.

2. An apparatus according to claim 1, wherein said whipping means includes an elongated shaft rotatably disposed along a central axis of said tube means, said shaft having a plurality of fins extending therefrom.

3. An apparatus as set forth in claim 1 further including means for selectively injecting a gas from a pressurized source into the food substance to form a mixture.

4. An apparatus as set forth in claim 3 wherein the whipping means is also for emulsifying the injected gas with the food substance.

5. An apparatus as set forth in claim 1 wherein the tube means is a heat exchanger.

6. An apparatus according to claim 2, wherein at least a portion of said fins include a perforation disposed therein.

7. An apparatus according to claim 6, wherein said perforations in said fins include openings disposed at central portions thereof.

8. An apparatus according to claim 7, wherein a surface area of each of said openings is approximately equal to one quarter of a surface area of a corresponding fin.

9. An apparatus according to claim 2, wherein said shaft includes a dispensing fin portion proximate said outlet end of said tube means upon which a plurality of dispensing fins are disposed, a scooping fin portion disposed proximate said inlet end of said tube means having a scooping fin extending therefrom, and a whipping fin portion disposed between said dispensing fin portion and said scooping fin portion, and having a plurality of whipping fins disposed thereon.

10. An apparatus according to claim 9, wherein said whipping fins are angled at about 30° with respect to said central axis.

11. An apparatus for processing a food substance, the apparatus comprising:
   a tube, having an inlet end and an outlet end;
   a T-connector having a first port, a second port, and a third part, said first port being connected to a source of food substance via a food line;
   a mixing conduit having a predetermined length for connecting said second port of said T-connector to said tube, said third port of said T-connector being disposed at an angle of about 90° with respect to said second port and being connected to a pressurized source of gas; and
   means disposed within said tube for whipping into a mixture food substance from said source of food substance with gas from said pressurized source of gas, said whipping means propelling a first portion of said mixture in a helical pattern from said inlet end of said tube toward said outlet end and having a plurality of portions spaced from one another within said tube for simultaneously propelling a second portion of said mixture in a direction from said outlet end toward said inlet end of said tube.

12. A method for processing food substances, the method comprising the steps of:
   mixing a gas with food substance to form a mixture;
   introducing the mixture into the interior of a tube having an inlet end and an outlet end;
   exposing the exterior of the tube to a fluid in order to change the temperature of the mixture within the tube; and
   whipping the mixture by propelling a first portion of the mixture from the inlet end of the tube toward the outlet end thereof while simultaneously propelling a second portion of the mixture from a plurality of spaced apart areas within the tube, in a direction from the outlet end of the tube toward the inlet end thereof to mix the gas with the food substances.

13. A method for processing food substance, the method comprising the steps of:
   introducing food substance into a tube having an inlet end and an outlet end; and
   exposing the exterior of the tube to a fluid in order to change the temperature of the food substance within the tube;
   whipping the food substance by propelling a first portion of the food substance from the inlet end of the tube toward the outlet end thereof while simultaneously propelling a second portion of the food substance, from a plurality of spaced apart areas within the tube, in a direction from the outlet end of the tube toward the inlet end thereof.

14. A method according to claim 13, wherein the step of whipping includes rotating an auger within the tube, the auger including a plurality of fins disposed thereon, at least a portion of the fins having openings disposed therein.

15. An auger and housing assembly, comprising:

a shaft having a central axis;

means connected to shaft for simultaneously propelling substance in a first direction parallel to the central axis, and in a second direction, opposite to said first direction;

a double walled tube surrounding the shaft and the propelling means, the tube having a space between the double walls thereof; and means, disposed in said space between said double walls for directing fluid along a helical path within the space.

16. An auger according to claim 15, wherein said propelling means includes a plurality of fins connected to said shaft.

17. An auger according to claim 16, wherein at least a portion of said fins include openings disposed therein.

18. A food processing apparatus as set forth in claim 1, wherein the fluid is refrigerant, and further including means for supplying refrigerant to said inlet end of said tube means.

* * * * *

UNITED STATES PATENT AND TRADEMARK OFFICE
CERTIFICATE OF CORRECTION

PATENT NO. : 5,151,288

DATED : September 29, 1992

INVENTOR(S) : Ernest Wayne Curry et al.

It is certified that error appears in the above-identified patent and that said Letters Patent is hereby corrected as shown below:

Claim 11, column 10, line 21, change "part" to --port--.

Signed and Sealed this

Twelfth Day of October, 1993

Attest:

BRUCE LEHMAN

*Attesting Officer*      *Commissioner of Patents and Trademarks*